US012056223B2

United States Patent
Songtao et al.

(10) Patent No.: US 12,056,223 B2
(45) Date of Patent: Aug. 6, 2024

(54) ACCURACY IMPROVEMENT IN BIOMETRIC FUSION BASED IDENTIFICATION

(71) Applicant: THALES DIS FRANCE SAS, Meudon (FR)

(72) Inventors: Li Songtao, Austin, TX (US); Amit Pandey, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 461 days.

(21) Appl. No.: 17/307,469

(22) Filed: May 4, 2021

(65) Prior Publication Data
US 2022/0358196 A1    Nov. 10, 2022

(51) Int. Cl.
    *G06F 21/32* (2013.01)
    *G06F 21/40* (2013.01)
    *G06N 3/02* (2006.01)

(52) U.S. Cl.
    CPC .............. *G06F 21/32* (2013.01); *G06F 21/40* (2013.01); *G06N 3/02* (2013.01)

(58) Field of Classification Search
    CPC ........ G06F 21/32; G06F 21/40; G06F 18/254; G06N 3/02; G06V 40/70
    See application file for complete search history.

(56) References Cited

U.S. PATENT DOCUMENTS 7,929,733 B1 *  4/2011  Lehnert ................. G06V 20/30
                                                            382/209

OTHER PUBLICATIONS

V. N. Dvornychenko, "Evaluation of fusion methods for latent fingerprint matchers," 2012 5th IAPR International Conference on Biometrics (ICB), New Delhi, India, 2012, [retrieved on Oct. 3, 2023], from the Internet: <URL: https://ieeexplore.ieee.org/document/6199806> (Year: 2012).*
Alay et al., "Deep Learning Approach for Multimodal Biometric Recognition System Based on Fusion of Iris, Face, and Finger Vein Traits", Sensors 2020, 20, 5523, [retrieved on Oct. 4, 2023], from the Internet: <URL: https://www.mdpi.com/1424-8220/20/19/5523> (Year: 2020).*

* cited by examiner

Primary Examiner — Philip J Chea
Assistant Examiner — Sangseok Park

(57) ABSTRACT

The present invention relates to a method of fusing at least two different candidate lists into a single candidate list, said at least two different candidate lists being generated by matching biometric data captured from an individual to be identified and biometric data enrolled from candidates to calculate match scores of candidates and ranking said match scores, the method comprising steps of:
  normalizing the match scores of the candidates of said at least two different candidate lists;
  ranking at least part of the candidates of said at least two different candidate lists in a single candidate list according to said normalized match scores to fuse said at least two different candidate lists;
  identifying at least one candidate belonging to multiple lists of said at least two different candidate lists; and
  raising said identified at least one candidate's rank in said single candidate list.

30 Claims, 2 Drawing Sheets

Fig. 1
(prior art)
| TruemateId | Rank | CandidateId_A | Score_A | CandidateId_B | Score_B | CandidateId_C | Score_C |
|---|---|---|---|---|---|---|---|
| G120004 | 1 | M288320 | 1119 | G418006 | 1056 | M288320 | 1119 |
| | 2 | C592500 | 1032 | C976910 | 1032 | G418000 | 1056 |
| | 3 | Y610180 | 1002 | A638000 | 979 | C592500 | 1032 |
| | 4 | F500842 | 992 | F210541 | 954 | C976910 | 1032 |
| | 5 | C100751 | 966 | C621800 | 920 | Y610180 | 1002 |
| | 6 | E500192 | 915 | J293904 | 915 | F500842 | 992 |
| | 7 | N780701 | 893 | M225400 | 908 | A638000 | 979 |
| | 8 | A320491 | 893 | B100713 | 908 | C100751 | 966 |
| | 9 | A395310 | 883 | A560810 | 899 | F210541 | 954 |
| | 10 | E700110 | 870 | G120004 | 897 | C621800 | 920 |
| | 11 | B717050 | 865 | M341600 | 893 | E500192 | 915 |
| | 12 | A861300 | 864 | A684110 | 889 | J293904 | 915 |
| | 13 | A237510 | 864 | D760011 | 872 | M225400 | 908 |
| | 14 | B067200 | 858 | A400022 | 871 | B100713 | 908 |
| | 15 | S588100 | 847 | O713801 | 864 | A560810 | 899 |
| | 16 | A510300 | 847 | M420000 | 863 | G120004 | 897 |
| | 17 | G997420 | 847 | A797100 | 859 | M341600 | 893 |
| | 18 | H020712 | 838 | E500060 | 857 | N780701 | 893 |
| | 19 | D739801 | 838 | G483204 | 852 | A320491 | 893 |
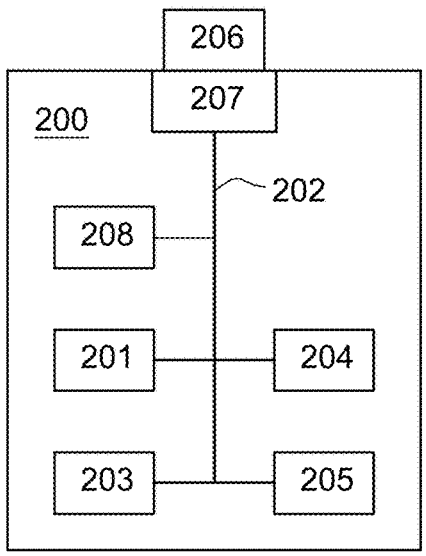
Fig. 2
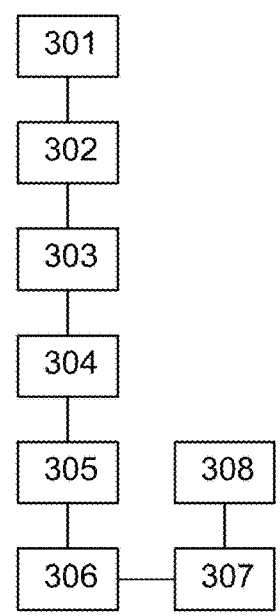
Fig. 3

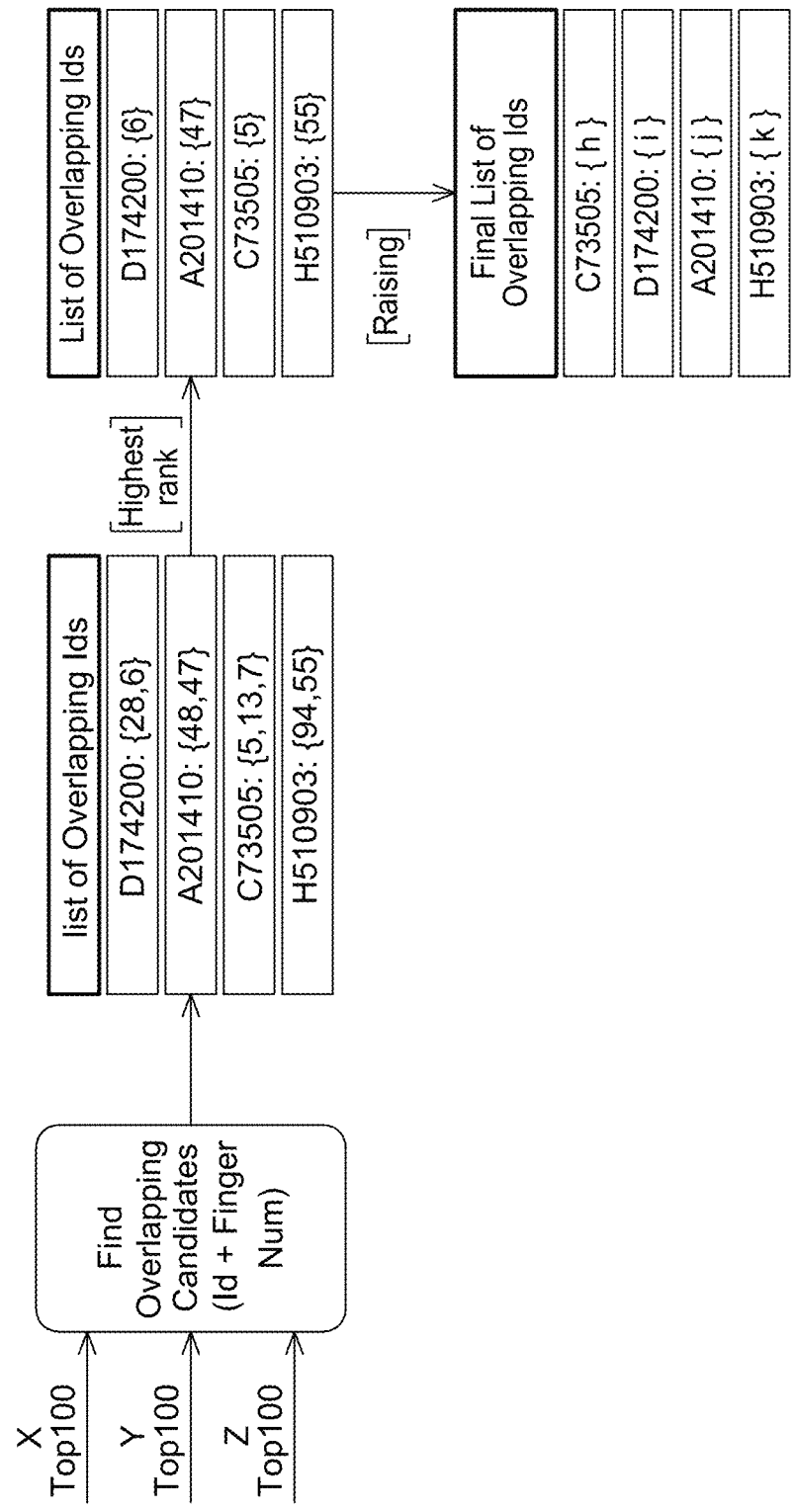

ACCURACY IMPROVEMENT IN BIOMETRIC FUSION BASED IDENTIFICATION

TECHNICAL FIELD

The present invention relates generally to a biometric fusion method and system, and more particularly to a method for improving the accuracy of identification results provided by a biometric fusion-based identification system.

BACKGROUND

Biometrics refers to technologies used to measure human physical or behavioral characteristics such as fingerprints, iris, face, retina, hand geometry, voice, or signatures and using such measures to detect and recognize individuals.

Traditionally, in most biometric systems, only one single biometric modality is employed, e.g., Automatic Fingerprint Identification Systems, Live Face Identification Systems, etc. Unfortunately, biometric systems with a single modality present several limitations which in some cases make the performance insufficient for the related single modality system in terms of accuracy, universality, distinctiveness, acceptability. To overcome such kinds of limitations, methods of combining multiple biometric modalities (e.g., fingerprints, palm prints, iris, face, etc.) have attracted increasing attention for improving the ability of systems to handle poor quality and incomplete data, achieve scalability to manage huge databases of users, ensure interoperability and protect user privacy against attacks. In some applications, multiple biometric measurements of the same modality (e.g., fingerprints of different fingers) can be scored and fused to improve identification accuracy.

The current biometric fusion solution receives multiple different score/rank lists of candidates generated by matching different captured biometric data of an individual with pre-stored biometric templates and fuses the multiple score/rank lists to a final score/rank list of candidates. It is often considered that a candidate having a higher score/rank is more likely to be the true mate (i.e., the real owner) of the biometric data in question.

However, in the current fusion solution, the score/rank of the true mate may sink in the final fused candidate list, or even get eliminated from the final list, due to various reasons such as different feature extraction methods and score distributions used by the multiple matchers. More specifically, the minutiae extracted by different extractors can be a bit different based on the fingerprint quality and the inherent design of the extractor, which ultimately leads to different score distributions for the matching candidate lists.

For example, FIG. 1 illustrates an example of fusing candidate lists in the prior art. As shown in FIG. 1, there is a first candidate list "A" with a top-ranked candidate M288320 associated with a score 1119, a second candidate list "B" with a top-ranked candidate G418006 associated with a score 1056, and a fused candidate list "C" which is fused from the first candidate list and the second candidate list.

The first candidate list is generated based on a biometric matching method A which compares features extracted from a fingerprint image captured from an individual with pre-stored fingerprint features (or templates) enrolled from a plurality of candidates. The second candidate list is generated by a different biometric matching method B. A candidate of each list is ranked according to a match score calculated by the corresponding method. The fused candidate list is generated by re-ranking the candidates of both lists according to their scores.

Here, we know the true mate is the candidate G120004. This candidate is ranked at the $10^{th}$ position on the second candidate list. However, after the fusion, it is ranked at the $16^{th}$ position of the fused candidate list.

The sinking of the score/rank of the true mate in the final fused candidate list is undesirable as it will lower the identification accuracy and efficiency.

SUMMARY

To solve the above-mentioned technical problem, the present invention provides a simple and unique method to improve the accuracy of the final biometric fusion result.

According to the invention, there is a method of fusing at least two different candidate lists into a single candidate list, the at least two different candidate lists being generated by matching biometric data captured from an individual to be identified and biometric data enrolled from candidates to calculate match scores of candidates and ranking the match scores, the method comprising steps of:
  normalizing the match scores of the candidates of the at least two different candidate lists;
  ranking the candidates of the at least two different candidate lists in a single candidate list according to the normalized match scores to fuse the at least two different candidate lists;
  identifying at least one candidate belonging to multiple lists of the at least two different candidate lists; and
  raising the at least one identified candidate's rank in the single candidate list.

In this invention, biometric data refers to data such as a latent image, a feature vector, a feature template, etc., representative of physical or behavioral human characteristics (such as fingerprints, iris, face, retina, hand geometry, voice, or signatures). As we know, biometric data may be used to detect and recognize individuals.

As aforementioned, to identify a person based on biometric fusion, different types (or modalities) of biometric data (e.g., fingerprints, iris, face, retina, hand geometry, voice, or signatures) may be collected from the person and respectively compared with different types of biometric data enrolled from a group of candidates.

Usually, each modality of biometric data is processed by a matching method dedicated to that modality. As a result, biometric data of different modalities will result in different lists of candidates (e.g., the lists may comprise different candidates, same candidates with different rankings, etc.). The objective of the invention is to fuse the different lists of candidates into a final fused list while preventing the true mate (i.e., the real owner) of the biometric data from sinking in the final fused list.

It should be noted that the same matching method may also generate different candidate lists. For example, a fingerprint matching method may generate different candidate lists based on different biometric data of the same modality (e.g., prints of different fingers of a person).

To raise the true mate's ranking to enhance its visibility in the final fused list, a pre-alignment process is applied to the scores of the candidates of the different candidate lists to prevent candidate scores of a list from overweighting those of another list. In other words, the candidate scores from different matching methods are normalized to reduce or eliminate dissimilarities between the scores. This is useful as extracting biometric feature templates and scoring the matching pairs are often generated by vendor-specific and/or modality-dependent biometric identification methods/systems. Also, dissimilarities between the matching scores from different matching templates/algorithms/databases are expected. Different matchers use different match score scales.

So, score normalization needs to be done in this situation, where the match scores returned from different matchers/matching methods are transformed into the common domain/scale.

The normalized scores of the candidates from the different candidate lists may be used to generate a new list of candidates, called a fused list, wherein the candidates from the different candidate lists are ranked according to their normalized scores.

The inventors have found after a large number of tests and analysis that the true mate of the biometric data to be identified may not get high ranks in the different candidate lists due to various reasons, for example, poor quality of latent fingerprint image, different algorithms used by the matching methods. But if a candidate is repeatedly detected by multiple (e.g., two, three, or more) candidate lists, it is probable to be the true mate.

Indeed, the tests have proved that when a candidate, from a database of about 5,000,000 candidates, is hit by three lists of 100 candidates generated from different fingerprint matchers, this candidate is quite likely to be the true mate, even it may be ranked at a level of $50^{th}$ position in the three lists. It is rare for a non-true mate candidate of the database to be hit by the three lists.

Based on such a test result, the inventors have thought to identify the candidate(s) that belong(s) to multiple lists of the different candidate lists to be fused, as there is a great possibility that the candidate(s) be the true mate. The rank(s) of the identified candidate(s) is/are boosted (or raised) to a higher position(s) or even the first position in the final list to improve the accuracy of the fusion result.

In an example, the step of raising the at least one identified candidate's rank comprises steps of:
  selecting the highest rank of the at least one identified candidate among the multiple lists to which the at least one identified candidate belongs;
  applying a predetermined parameter to the highest rank to obtain a raised rank of the at least one identified candidate in the single candidate list.

As mentioned above, the candidate(s) which is(are) hit by multiple different candidate lists are more likely to be the true mate than other candidates. In this document, the multi-hit candidate may be also called overlapped candidate. The overlapped candidate has multiple ranks in the respective candidate lists to which it belongs.

As learned from the tests and observations of the inventors, the overlapped candidate has a relatively higher possibility of being the true mate and thus its rank needs to be raised (or boosted) in the final fused list.

To this end, we may select the highest rank of the overlapped candidate among the multiple candidate lists hitting the candidate to raise this highest rank. One raising manner is to apply a parameter to the highest rank (e.g., multiplying the highest rank by a predetermined factor between 0 and 1, such as 0.1, 0.5, etc.) of the overlapped candidate, to let the overlapped candidate be placed at a prominent position (e.g., $1^{st}$ rank) or within a rank range (e.g., top 3, top 5, top 10, etc.) in the final fused list. This position or rank range may be predetermined according to the preference settings of users of the fusing method.

In an alternative instance, the step of selecting the highest rank of the overlapped candidate may be omitted. The final rank of the overlapped candidate may be directly raised to a predetermined position or within a predetermined rank range in the final list regardless of other factors such as the previous ranks or scores of the overlapped candidate. Compared to the previous raising manner, this manner is more aggressive and allows saving computing resources.

In an example, the at least one identified candidate is multiple candidates belonging to different numbers of multiple candidate lists of the at least different two candidate lists, wherein the predetermined parameters applied to the multiple candidates' highest ranks are differently determined according to the numbers of multiple candidate lists to which the multiple candidates belong.

This implementation is beneficial when there are multiple candidates which are hit by (or present on) different numbers of candidate lists. For example, in a case where three different candidate lists are ready to fuse, a candidate is found in two lists and another candidate in all the three lists.

It is proved by the tests of the inventors that if a candidate is detected by more different lists, it is more likely to be the true mate. Therefore, when there are multiple candidates found by different numbers of candidate lists, we may apply different raising factors to raise the final ranks of the multiple overlapped candidates.

For example, if a first overlapped candidate belongs to more candidate lists than a second overlapped candidate does, we may use a better raising parameter or factor to the first overlapped candidate to put the first candidate at a higher rank position than the second candidate in the final list.

Thus, the accuracy of the fusion result is further improved.

In an example, the step of raising the at least one identified candidate's rank comprises a step of:
  raising one of the at least one identified candidate's rank to a top position in the single candidate list.

As mentioned above, this raising manner omitting the selection of the highest rank of the overlapped candidate is more aggressive and allows saving computing resources. Moreover, the $1^{st}$ ranked candidate may be considered to be the true mate suggested by the fusion method. This is efficient for a user to quickly get an identification result.

In an example, the method further comprises a step of outputting the single list of matched candidates in which the at least one identified candidate's rank is raised so that the individual is identified according to at least the candidate ranks of the outputted single candidate list.

This is useful for a user who wants to further check the candidates on the final list to get an identification result by himself.

In an example, the outputted single list of matched candidates comprises match scores of the candidates, a match score of the at least one identified candidate being determined by finding a normalized score corresponding to the raised rank.

Providing the match scores in the final list may enable a user to have more information to decide the true mate by himself.

In an example, at least some lists of the at least two candidate lists are generated based on biometric data of different biometric modalities.

In an example, at least some lists of the at least two candidate lists are generated based on biometric data of the same biometric modality.

In an example, the at least two candidate lists are generated by different biometric identification methods.

In an example, at least one of the at least two candidate lists is generated by a deep-learning based biometric identification method.

In an example, there is a biometric fusion system comprising a processor adapted to perform the steps of the method according to the invention.

In an example, there is a computer program comprising instructions which, when the program is executed by a processor of a biometric fusion system, cause the system to carry out the steps of the method according to the invention.

In an example, there is a computer-readable storage medium comprising instructions which, when executed by the computer, cause the computer to carry out the steps of the method according to the invention.

The foregoing has outlined rather generally the features of one or more embodiments of the present invention so that the detailed description of the present invention that follows may be better understood. Additional features and advantages of the present invention will be described hereinafter which may form the subject of the claims of the present invention.

The advantages and features of the system and the computer program according to the embodiments of the present invention are the same as those of the above-described method and will not be repeated here.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 1 illustrates an example of fusing different candidate lists into a final candidate list in the prior art;

FIG. 2 represents a hardware configuration of a biometric fusion system for practicing the principles of the present invention in accordance with an embodiment of the present invention;

FIG. 3 illustrates a flowchart of a method performed by the biometric fusion system of FIG. 2 in accordance with an embodiment of the present invention.

FIG. 4 represents raising ranks of candidates in a final fused list in accordance with an embodiment of the present invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

FIG. 2 depicts a schematic hardware configuration of a biometric fusion device 200 in accordance with a particular example. The device 200 may include a processor 201 connected via a bus 202 to a random access memory (RAM) 203, a read-only memory (ROM) 204, and/or a non-volatile memory (NVM) 205. The device 200 further includes a connector 206 connected to the processor and by which the device 200 may be connected to an communication module. Such a communication module may be used to connect the device 200 to various forms of wireless networks, e.g., wide-area networks, WiFi networks, or mobile telephony networks. Alternatively, the device 200 may connect to networks via wired network connections such as Ethernet. The device 200 may also include input/output means 207 providing interfaces to the user of the device, such as one or more screens, loudspeakers, a mouse, tactile surfaces, a keyboard etc.

The device 200 further comprises a memory 208 storing the method of the present invention. The device 200 may input different candidate lists to be fused to the processor 201 through the bus 202. The different candidate lists may be generated by various program applications implemented within the device 200 itself or received from the device 200 from external devices via a wired or wireless telecommunication network.

The device 200 may receive a fused candidate list generated from the different candidate lists and output by the processor 201 when it executes the method stored in the memory 208.

The device 200 may send the fused candidate list via a wired or wireless telecommunication network to a device which needs the fused candidate list to do further analysis.

FIG. 3 illustrates a schematic process flow of a method 300 of fusing at least two different candidate lists into a single candidate list. The method is suitable to be performed by the biometric fusion device shown in FIG. 2.

In the current example, we assume there are three different candidate lists respectively generated by three biometric matching methods/applications/systems X, Y, and Z. We assume that the lengths of these lists are the same, for example, each comprising 100 candidates.

The number of different candidate lists is not limited by the invention. X, Y, and Z may be performed by the device 200 or external devices adapted to communicate with the device 200 via communication means.

In this example, X and Y may be different identification algorithms adapted to match fingerprint latent images of an individual to be identified with fingerprint templates extracted from groups of candidates and stored in databases accessible by X and Y. Z may be a third fingerprint identification algorithm based on deep learning.

It should be noted that in other examples, the different candidate lists may be generated based on different modalities of biometric data, for example, fingerprints, iris, face, retina, hand geometry, voice, signatures, etc.

It also be noted that the different candidate lists may be generated by a single identification algorithm/application/system based on different biometric data of a single modality, for example, prints of different fingers of the individual to be identified.

Each of X, Y, Z may calculate match scores from the matching of the individual's captured biometric data (e.g., fingerprints) and biometric data of groups of candidates that X, Y, Z may access.

According to the calculated match scores, X, Y, and Z may respectively generate their candidate lists. The candidate lists may comprise candidate IDs ranked for example in an order from the highest score to the lowest score. The rank order may be reversed.

The candidate ID may comprise an individual ID and an object ID. The object ID may indicate the type (e.g., fingerprint, palm print, iris, face, retina, etc.) and/or the part (e.g., which finger, hand, eye, etc.) of the biometric data.

The candidate lists may optionally associate the calculated match scores with the corresponding candidates.

The candidate lists may have the same length, which is however not limited by the invention.

The device 200 may normalize, in step 301, the match scores of the candidates of the different candidate lists generated by X, Y, and Z. Various existing normalized methods may be used here, for example, tan h-estimator, Min-Max normalization and Z-score normalization, etc.

The device 200 may rank, in step 302, the candidates of the three different candidate lists into a single candidate list according to the normalized match scores. For example, placing a candidate with a greater score at a higher position of the list.

The device 200 may identify, in step 303, one or more candidates belonging to (or hit by) multiple lists of the different candidate lists from X, Y, and Z.

It should be noted that step 303 may be performed by the device 200 before either or both of steps 301 and 302. In other words, steps 301 and 302 are not prerequisites of step 303.

FIG. 4 schematically illustrates a specific situation wherein the original ranks of four candidates identified in step 303 are raised in the final fused list of candidates. It should be noted that the number of overlapping (or overlapped) candidates is not limited by the invention.

As can be seen, a first candidate D174200 is found in two candidate lists. Correspondingly, this candidate has two ranks 28 and 6. A second candidate A201410 is present in two candidate lists with ranks of 48 and 47. A third candidate C735050 is hit by all the three candidate lists and have ranks of 5 and 13 and 7. A fourth candidate H510903 is found in two candidate lists with ranks of 94 and 55.

For each of the identified candidates, the device 200 may select, in step 304, the highest rank from its original ranks, i.e., from its ranks of the multiple lists to which this candidate belongs. However, it shall be noted that step 304 may be omitted in another example wherein all the identified overlapping candidates are found in the same number of multiple lists (e.g., all candidates are hit by two candidate lists).

For example, the rank 6 is selected for the first candidate D174200, the rank 47 for the second A201410, the rank 5 for the third candidate C735050, and the rank 55 for the fourth candidate H510903.

The device 200 raises, in step 305, the selected ranks of the candidates.

We note that in the current example, the third candidate C735050 belongs to more lists (e.g., 3 lists) than the other identified overlapping candidates D174200, A201410, and H510903 (e.g., 2 lists). It means the third candidate C735050 has a greater possibility than the other overlapping candidates to be the true mate.

To further reflect this difference in the final fused list and further improve the ranking accuracy, we raise the highest ranks of the identified candidates by applying different factors to their highest ranks.

Alternatively, the method may apply enhancing factors to the normalized scores corresponding to the highest ranks of the identified candidates to raise their normalized scores and adjust their final ranks according to the raised normalized scores.

In the current example, the third candidate C735050's highest rank 5 is multiplied by a factor f3 (e.g., $0<f3<1$) to become a raised final rank h (e.g., $0<h<5$) in the fused list. The first candidate D174200's highest rank 6 is multiplied by a factor f1 (e.g., $0<f1<1$) to become a raised final rank i (e.g., $h<i<6$). The second candidate A201410's highest rank 47 is multiplied by a factor f2 (e.g., $0<f2<1$) to become a raised final rank j (e.g., $i<j<47$). The fourth candidate H510903' highest rank 55 is multiplied by a factor f4 (e.g., $0<f4<1$) to become a raised final rank k (e.g., $j<k<55$).

In the current example, the raising factor f3 for the identified candidate C735050 may be chosen to be the smallest among the factors f1, f2, f3, and f4 since the candidate is hit by more lists than the others identified candidates do. Additionally, the factor f3 may be chosen so that the raised final rank h of the candidate C735050 is the highest among the four identified candidates. In an example, the factor f3 may be chosen so that the candidate C735050 becomes the top 1 ranked candidate in the final list.

The raising factors f1, f2, and f4 for the other identified candidates may be differently chosen according to their original highest ranks. In an example, a smaller raising factor may be awarded to a higher highest rank. For example, it may be established that $0<f1<f2<f4<1$ because 6 (D174200's original highest rank)<47 (A201410's original highest rank)<55 (H510903's original highest rank). This factor choosing strategy taking into account the candidates' original highest ranks may further improve the accuracy of the candidates' final ranks.

Alternatively, the raising factors f1, f2, and f4 for the other identified candidates may be the same.

In other examples, the identified one or more candidates may be directly raised to a predetermined rank position (e.g., rank $1^{st}$) or a predetermined rank range (e.g., top 3, 5, 10, etc.) of the final fused list.

The device 200 may output, in step 306, the final single candidate list in which the identified candidates' final ranks have been determined during the raising step 305. For example, the final list may be outputted to the input/output means 207 of the device 200.

The device 200 may determine, in step 307, the top 1 ranked candidate of the final fused list to be the true mate (i.e., the individual to be identified).

Alternatively or additionally, the device 200 may send, in step 308, the final fused list to a remote device via networks for a user to perform further investigations.

The final list may have the same length (e.g. 100 candidates) as the initial candidate lists X, Y, Z.

The final list may comprise the match scores of the candidates. A match score of the overlapping candidates may be determined by finding the normalized scores, determined in step 301, corresponding to the raised ranks of the overlapping candidates. Non-overlapping candidates' score are their normalized scores calculated in step 301.

With the initial analysis of the inventor, they noticed that even with the Pre-Alignment (or normalization), not all true mates were retaining their best rankings, few were still getting pushed down, not as much as without alignment. This made them think about what else can be done to retain the original ranking of the true mate if there is any.

The inventors considered to look out for hints that a potential true mate is present. They explored different options like analyzing the score distribution and looking at the statistics to see if there is a strong difference in the score distribution when a true mate is present. The inventors finally settled on exploring the overlapping candidate method, because of its uniqueness, simplicity, and ease of implementation.

If any candidate Id, present more than once among all the available lists, that means we have an overlapped candidate.

And when there is found an overlap candidate, its final ranking will be improved, as the confidence factor on it is more. If the overlapped candidate lists contain the true mate, we have a high chance of retaining the best ranking of the mate or even improving it than before.

Improving Rank Logic is simple and straightforward, firstly we will select the best ranking of the overlapping candidate among the common lists, then boost its score, and based on that score, find its new ranking.

The method of the invention is especially useful when applied to the matching results of latent fingerprints. It is proved by the tests that with the invention, the rank 1 accuracy (i.e., the true mate accuracy of an overlapped candidate whose rank is raised to the $1^{st}$ position of the final list) is improved on an average by 36.32% over 4 different latent fingerprint databases. The chances of the ranking of the true mate if present getting pushed down because of this algorithm will be no more than 2-3 ranks on an average. This would change when dealing with other non-latent fingerprint data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of producing a single fused candidate list the method comprising:
    generating at least two different candidate lists each being generated by matching biometric data captured from an individual to be identified against biometric data stored as enrolled candidates to calculate match scores of candidates wherein each said at least two different candidate lists contain match scores for a subset of said enrolled candidates;
    ranking at least part of the candidates of said at least two different candidate lists in a single fused candidate list according to respective ranks of said at least part of the candidates in said at least two different candidate lists to fuse said at least two different candidate lists;
    identifying at least one candidate belonging to multiple lists of said at least two different candidate lists; and
    raising the rank of said at least one identified candidate belonging to multiple lists of said at least two different candidate lists in said single fused candidate list with respect to candidates belonging to fewer candidate lists.

2. The method according to claim 1, wherein said step of raising the rank of said at least one identified candidate comprises steps of:
    selecting the highest rank of said at least one identified candidate among the multiple lists to which said identified at least one candidate belongs;
    applying a predetermined parameter to said highest rank to obtain a raised rank of said at least one identified candidate in said single fused candidate list.

3. The method according to claim 2, wherein said at least one identified candidate is multiple candidates belonging to different numbers of multiple candidate lists of said at least two different candidate lists, wherein the predetermined parameters applied to said multiple candidates' highest ranks are differently determined according to the numbers of multiple candidate lists to which said multiple candidates belong.

4. The method according to claim 1 wherein said step of raising the rank of said at least one identified candidate comprises a step of:
    raising one of said identified at least one candidate's rank to a top position in said single fused candidate list.

5. The method according to claim 1, wherein the method further comprises a step of outputting said single fused candidate list in which said at least one identified candidate's rank is raised so that said individual is identified according to at least the candidate ranks of said outputted single candidate list.

6. The method according to claim 5, further comprising normalizing the match scores of the candidates of said at least two different candidate lists and wherein said outputted single fused candidate list comprises match scores of the candidates, a match score of said identified at least one candidate being determined by finding a normalized score corresponding to said raised rank.

7. The method according to claim 1, wherein at least some lists of said at least two different candidate lists are generated based on biometric data of different biometric modalities.

8. The method according to claim 1, wherein at least some lists of said at least two different candidate lists are generated based on biometric data of a same biometric modality.

9. The method according to claim 1, wherein said at least two different candidate lists are generated by different biometric identification methods.

10. The method according to claim 1, wherein at least one of said at least two different candidate lists is generated by a deep-learning based biometric identification method.

11. A biometric fusion system comprising a processor adapted to fuse at least two different candidate lists into a single fused candidate list, said at least two different candidate lists being generated by matching biometric data captured from an individual to be identified and biometric data enrolled from candidates to calculate match scores of candidates and ranking said match scores wherein each said at least two different candidate lists contain match scores for a subset of said enrolled candidates, by performing the steps:
    ranking at least part of the candidates of said at least two different candidate lists in a single fused candidate list according to respective ranks of said at least part of the candidates in said at least two different candidate lists to fuse said at least two different candidate lists;
    identifying at least one candidate belonging to multiple lists of said at least two different candidate lists; and
    raising the rank of said at least one identified candidate belonging to multiple lists of said at least two different candidate lists in said single fused candidate list with respect to candidates belonging to fewer candidate lists.

12. The biometric fusion system of claim 11 wherein said step of raising said at least one identified candidate's rank comprises steps of:

selecting the highest rank of said at least one identified candidate among the multiple lists to which said identified at least one candidate belongs;

applying a predetermined parameter to said highest rank to obtain a raised rank of said at least one identified candidate in said single fused candidate list.

13. The biometric fusion system of claim 12 wherein said at least one identified candidate is multiple candidates belonging to different numbers of multiple candidate lists of said at least two different candidate lists, wherein the predetermined parameters applied to said multiple candidates' highest ranks are differently determined according to the numbers of multiple candidate lists to which said multiple candidates belong.

14. The biometric fusion system of claim 11 wherein said step of raising said identified at least one candidate's rank comprises a step of:

raising one of said identified at least one candidate's rank to a top position in said single fused candidate list.

15. The biometric fusion system of claim 11, wherein the processor is further adapted to perform a step of outputting said single fused candidate list in which said at least one identified candidate's rank is raised so that said individual is identified according to at least the candidate ranks of said outputted single candidate list.

16. The biometric fusion system of claim 15, wherein said biometric fusion system further performs normalizing the match scores of the candidates of said at least two different candidate lists and said outputted single fused candidate list comprises match scores of the candidates, a match score of said identified at least one candidate being determined by finding a normalized score corresponding to said raised rank.

17. The biometric fusion system of claim 11 wherein at least some lists of said at least two different candidate lists are generated based on biometric data of different biometric modalities.

18. The biometric fusion system of claim 11 wherein at least some lists of said at least two different candidate lists are generated based on biometric data of a same biometric modality.

19. The biometric fusion system of claim 11 wherein said at least two different candidate lists are generated by different biometric identification methods.

20. The biometric fusion system of claim 11 wherein at least one of said at least two different candidate lists is generated by a deep-learning based biometric identification method.

21. A nontransitory computer-readable storage medium comprising instructions which, when executed by a computer, cause the computer to fuse at least two different candidate lists into a single candidate list, said at least two different candidate lists being generated by matching biometric data captured from an individual to be identified and biometric data enrolled from candidates to calculate match scores of candidates and ranking said match scores, by performing the steps:

ranking at least part of the candidates of said at least two different candidate lists in a single fused candidate list according to respective ranks of said at least part of the candidates in said at least two different candidate lists to fuse said at least two different candidate lists;

identifying at least one candidate belonging to multiple lists of said at least two different candidate lists; and raising the rank of said at least one identified candidate belonging to multiple lists of said at least two different candidate lists in said single fused candidate list with respect to candidates belonging to fewer candidate lists.

22. The nontransitory computer-readable storage medium of claim 21 wherein said step of raising said at least one identified candidate's rank comprises steps of:

selecting the highest rank of said at least one identified candidate among the multiple lists to which said identified at least one candidate belongs;

applying a predetermined parameter to said highest rank to obtain a raised rank of said at least one identified candidate in said single fused candidate list.

23. The nontransitory computer-readable storage medium of claim 22 wherein said at least one identified candidate is multiple candidates belonging to different numbers of multiple candidate lists of said at least two different candidate lists, wherein the predetermined parameters applied to said multiple candidates' highest ranks are differently determined according to the numbers of multiple candidate lists to which said multiple candidates belong.

24. The nontransitory computer-readable storage medium of claim 21 wherein said step of raising said identified at least one candidate's rank comprises a step of:

raising one of said identified at least one candidate's rank to a top position in said single fused candidate list.

25. The nontransitory computer-readable storage medium of claim 21, wherein the processor is further adapted normalize the match scores of the candidates of said at least two different candidate lists and to perform a step of outputting said single fused candidate list in which said at least one identified candidate's rank is raised so that said individual is identified according to at least the candidate ranks of said outputted single candidate list.

26. The nontransitory computer-readable storage medium of claim 25, wherein said outputted single fused candidate list comprises match scores of the candidates, a match score of said identified at least one candidate being determined by finding a normalized score corresponding to said raised rank.

27. The nontransitory computer-readable storage medium of claim 21 wherein at least some lists of said at least two different candidate lists are generated based on biometric data of different biometric modalities.

28. The nontransitory computer-readable storage medium of claim 21 wherein at least some lists of said at least two different candidate lists are generated based on biometric data of a same biometric modality.

29. The nontransitory computer-readable storage medium of claim 21 wherein said at least two different candidate lists are generated by different biometric identification methods.

30. The nontransitory computer-readable storage medium of claim 21 wherein at least one of said at least two different candidate lists is generated by a deep-learning based biometric identification method.

* * * * *